(12) United States Patent
Schibsbye

(10) Patent No.: US 9,032,621 B2
(45) Date of Patent: May 19, 2015

(54) CASTING METHOD FOR MANUFACTURING A WORK PIECE

(75) Inventor: Karsten Schibsbye, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 831 days.

(21) Appl. No.: 13/167,955

(22) Filed: Jun. 24, 2011

(65) Prior Publication Data

US 2012/0003101 A1    Jan. 5, 2012

(30) Foreign Application Priority Data

Jun. 30, 2010  (EP) .................................... 10006798

(51) Int. Cl.
| | | |
|---|---|---|
| B23P 17/00 | (2006.01) | |
| B23P 25/00 | (2006.01) | |
| B29C 45/76 | (2006.01) | |
| B29C 45/14 | (2006.01) | |
| F01D 5/14 | (2006.01) | |
| B29C 70/48 | (2006.01) | |
| B32B 37/00 | (2006.01) | |
| B29K 709/04 | (2006.01) | |
| B29L 31/08 | (2006.01) | |

(52) U.S. Cl.
CPC .......... *B29C 70/48* (2013.01); *B29C 2791/005* (2013.01); *B29K 2709/04* (2013.01); *B29L 2031/085* (2013.01); *Y02E 10/722* (2013.01)

(58) Field of Classification Search
USPC .......... 416/229 R, 230, 241 A, 241 B, 223 R; 264/40.1, 85, 257, 258, 39; 29/889.71, 29/889.7, 527.1, 527.2, 527.3
See application file for complete search history.

(56) References Cited

U.S. PATENT DOCUMENTS

| | | | | |
|---|---|---|---|---|
| 4,593,742 A | * | 6/1986 | Hazelett et al. ............... | 164/415 |
| 4,648,921 A | * | 3/1987 | Nutter, Jr. ....................... | 156/77 |
| 4,708,839 A | * | 11/1987 | Bellet et al. .................... | 264/85 |
| RE33,187 E | * | 3/1990 | Alexander et al. ........ | 428/848.4 |
| 4,916,016 A | * | 4/1990 | Bristowe et al. ........... | 428/411.1 |
| 4,970,045 A | * | 11/1990 | Steinberg et al. ............ | 264/310 |
| 5,042,968 A | * | 8/1991 | Fecto ............................. | 416/226 |
| 5,222,297 A | * | 6/1993 | Graff et al. ................ | 29/889.71 |
| 5,971,742 A | * | 10/1999 | McCollum et al. ........... | 425/542 |
| 5,981,618 A | * | 11/1999 | Martin et al. ................. | 523/106 |
| 6,056,838 A | * | 5/2000 | Besse et al. .................... | 156/75 |
| 6,532,799 B2 | * | 3/2003 | Zhang et al. ..................... | 73/38 |
| 6,856,856 B1 | * | 2/2005 | Kolavennu et al. ........... | 700/197 |
| 8,685,537 B2 | * | 4/2014 | Imai et al. ..................... | 428/403 |
| 8,852,495 B2 | * | 10/2014 | Blot et al. ..................... | 264/511 |
| 2004/0053055 A1 | * | 3/2004 | Robinson et al. ............. | 428/413 |
| 2005/0051926 A1 | * | 3/2005 | Guillot et al. ................. | 264/310 |
| 2005/0121138 A1 | * | 6/2005 | Hoshida et al. ............... | 156/285 |

(Continued)

FOREIGN PATENT DOCUMENTS

| | | |
|---|---|---|
| CN | 1154675 A | 7/1997 |
| EP | 1090732 A1 | 4/2001 |
| WO | WO 9604124 A1 | 2/1996 |

*Primary Examiner* — David Bryant
*Assistant Examiner* — Darrell C Ford

(57) ABSTRACT

A method for manufacturing a work piece is provided. The method includes preparing fiberglass in a mold, preparing a closed mold cavity around the fiberglass, flushing the closed mold cavity with an oxygen-free gas, injecting resin in the closed mold cavity, and curing the casted work piece. Furthermore, a work piece manufactured by the above method is provided.

10 Claims, 1 Drawing Sheet

(56) References Cited

U.S. PATENT DOCUMENTS

| | | | |
|---|---|---|---|
| 2005/0256278 A1* | 11/2005 | Crump et al. | 525/531 |
| 2007/0170618 A1* | 7/2007 | DiMarzio et al. | 264/319 |
| 2007/0274835 A1* | 11/2007 | Stiesdal | 416/230 |
| 2008/0308249 A1* | 12/2008 | Hetke | 164/284 |
| 2009/0146433 A1* | 6/2009 | Althoff et al. | 290/55 |
| 2010/0225013 A1* | 9/2010 | Eiha et al. | 264/1.1 |
| 2014/0140854 A1* | 5/2014 | Kirkegaard | 416/230 |
| 2014/0187911 A1* | 7/2014 | Bolan et al. | 600/411 |
| 2014/0220370 A1* | 8/2014 | Rodriguez et al. | 428/544 |

* cited by examiner

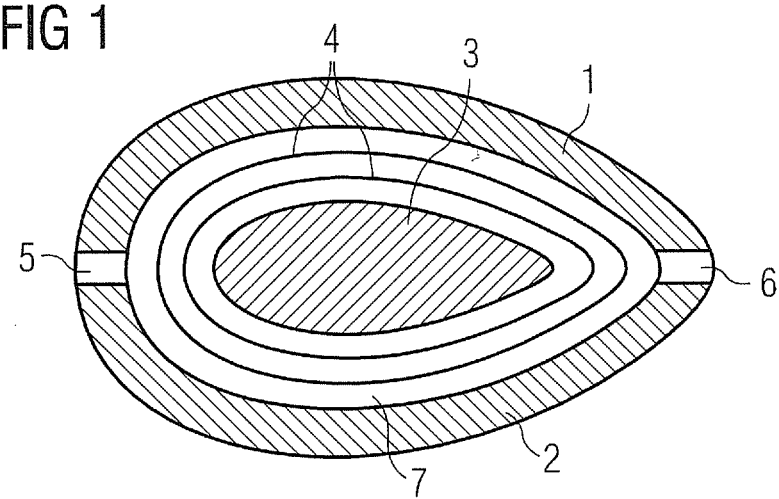
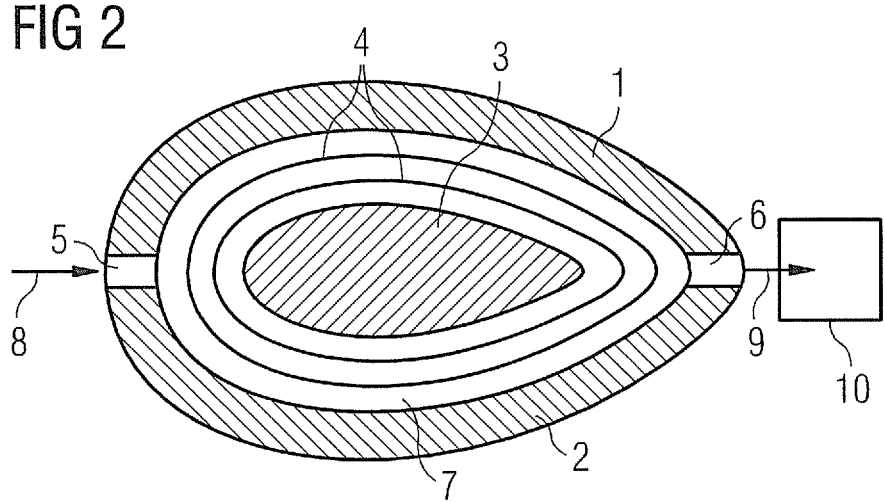

CASTING METHOD FOR MANUFACTURING A WORK PIECE

CROSS REFERENCE TO RELATED APPLICATIONS

This application claims priority of European Patent Office application No. 10006798.2 EP filed Jun. 30, 2010, which is incorporated by reference herein in its entirety.

FIELD OF INVENTION

The present invention relates to a method for manufacturing a work piece, especially a wind turbine rotor blade. It further relates to a work piece, for example a wind turbine rotor blade.

BACKGROUND OF INVENTION

Numerous work pieces, especially work pieces which comprise laminated structures like for example wind turbine rotor blades, are usually manufactured by casting resin into a closed mould with fibreglass lay-ups. One kind of resin which can be used for manufacturing work pieces like wind turbine rotor blades is polyester resin. Polyester resin is a very castable resin which can be used in fibreglass lay-ups for wind turbine rotor blade production. The curing time of the resin can be controlled by adding amounts of a catalyst. One difficulty however related to the use of polyester resin is that this resin has a very bad odor, as do the newly casted pieces and the workspace used.

SUMMARY OF INVENTION

It is therefore a first objective of the present invention to provide a method for manufacturing a work piece, which reduces the mentioned difficulties. It is a second objective of the present invention to provide a work piece which reduces the previously mentioned difficulties.

The above objectives are solved by the features of the independent claims. The depending claims define further developments of the present invention.

The inventive method for manufacturing a work piece comprises the steps of preparing fibreglass in a mould, preparing a closed mould cavity around the fibreglass, flushing the closed mould cavity with an oxygen-free gas, injecting resin in the closed mould cavity and curing the casted work piece. The inventive method substantially removes the described difficulties of prior art of casting, especially with polyester resin.

Advantageously the step of flushing the closed mould cavity with an oxygen-free gas can be performed before injecting resin in the closed mould cavity. Flushing the cavity with an oxygen-free gas before injecting the resin, for example polyester resin, has the result that the casted work piece does not smell bad. At least, the bad odor is drastically reduced. Bad odor may occur if oxygen is present during injecting resin, especially polyester resin, and curing. Furthermore, the inventive casting method has the positive side-effect that the surface of the casted piece, for example the casted rotor blade, obtains a better curing.

For example, the step of preparing fibreglass in the mould may comprise a step of placing a number of fibreglass layers in the mould. Additionally, further layers of other material than fibreglass can be placed in the mould, for example for increasing the stability of the work piece. Preferably, the work piece may be a wind turbine rotor blade.

The used oxygen-free gas for flushing the closed mould cavity can advantageously be a non-active gas, which means that it has a reduced chemical reactivity. Preferably, the closed mould cavity can be flushed with an inert gas, for example nitrogen.

The closed mould cavity may, for example, completely replaced by the oxygen-free gas. This effectively reduces the chemical reactions between the gas in the closed mould cavity and the injected resin. Hence, a bad odor of the casted work piece is reduced.

During the flushing with the oxygen-free gas the gas, for example air, in the interior of the closed mould cavity is leaving the closed mould cavity. The concentration of oxygen in the gas which is leaving the closed mould cavity during the flushing with the oxygen-free gas can be monitored. The closed mould cavity can comprise an outlet for the gas which is leaving with the closed mould cavity during the flushing with the oxygen-free gas. Preferably, the concentration of oxygen is monitored at this outlet. Advantageously, the concentration of oxygen can be monitored by an oxygen content monitor.

Preferably, the close mould cavity is flushed with the oxygen-free gas until the concentration of oxygen in the gas which is leaving the close mould cavity during the flushing with the oxygen-free gas is below a pre-defined value. Advantageously, the closed mould cavity is flushed until the oxygen in the leaving gas is totally removed.

A resin, especially a resin which comprises styrene, for example polyester resin and/or vinylester resin, can be injected in the closed mould cavity. Generally, the curing time of the resin can be controlled by adding a catalyst.

The inventive work piece is manufactured by the previously described method. The inventive work piece has the same advantages as the previously described inventive method, especially the casted work piece does not smell bad or its bad odor is at least drastically reduced.

The inventive work piece may comprise any resin, especially a resin comprising styrene. For example, it may comprise polyester and/or vinylester, especially cured polyester resin and/or cured vinylester resin. Preferably, the work piece is a wind turbine rotor blade.

BRIEF DESCRIPTION OF THE DRAWINGS

Further features, properties and advantages of the present invention will become clear from the following description of an embodiment in conjunction with the accompanying drawings. Generally, all mentioned features are advantageous alone and in any combination with each other.

FIG. 1 schematically shows a sectional view of a closed mould for manufacturing a wind turbine rotor blade.

FIG. 2 schematically shows a sectional view of a closed mould for manufacturing a wind turbine rotor blade during the flushing process.

DETAILED DESCRIPTION OF INVENTION

An embodiment of the present invention will now be described with a reference to FIGS. 1 and 2. The dimensioned of the objects in the Figures have been chosen for the sake of clarity and do not necessarily reflect the relative dimensions.

FIG. 1 schematically shows a sectional view of a closed mould for manufacturing a wind turbine rotor blade. For manufacturing a wind turbine rotor blade fibreglass, preferably a number of fibreglass layers 4, is prepared in a mould. The mould comprises an upper mould element 1, a lower mould element 2 and a core element 3.

At first, a number of fibreglass layers 4 are laid into the lower mould element 2. Then a core element 3 is laid onto the fibreglass layers 4 in the lower mould element 2. Then a number of fibreglass layers 4 are laid onto the core element 3 and are prepared around the core element 3. Afterwards the mould is closed by fitting the upper element 1 onto the lower mould element 2.

The closed mould comprising the lower mould element 2 and the upper mould element 1 comprises an inner cavity 7. The inner cavity 7 is filled with air. Moreover, the closed mould comprises an inlet opening 5 and an outlet opening 6.

FIG. 2 schematically shows the mould in a sectional view during the flushing process. In FIG. 2 the inlet 5 is used for injecting an oxygen-free gas, especially an inert gas, for example nitrogen, into the inner cavity 7. The flow direction of the injected gas is indicated by an arrow 8. The air in the inner cavity 7 is flushed out of the inner cavity 7 through the outlet 6. The flow direction of the gas leaving the inner cavity 7 is indicated by an arrow 9. By flushing the closed mould cavity with oxygen-free gas, for example nitrogen, it is ensured that substantially all air in the closed mould cavity 7 is replaced by the injected gas, for example nitrogen.

At the outlet 6 an oxygen content monitor 10 is located. When flushing the closed mould cavity with the oxygen-free gas, the outlet 6 of the closed mould is monitored by the oxygen content monitor 10. Hereby the level of oxygen in the flushed air is monitored. Preferably, the cavity 7 is flushed until the oxygen is totally removed or is below the predefined level. This can preferably be achieved by measuring the concentration of oxygen in the gas which leaves the outlet 6 in flow direction 9.

After flushing the closed mould cavity with, for example, nitrogen a resin is injected in the closed mould cavity 7. The used resin can comprise styrene. It can preferably be polyester resin. Alternatively, vinylester resin can be injected in the closed mould cavity 7. Afterwards, the casted structure is cured.

Due to the fact, that the injected resin does not come in contact with oxygen or any other chemically reactive gas during its injection or curing the casted structure or work piece, for example the manufactured wind turbine rotor blade, does not smell bad. At least its otherwise bad odor is drastically reduced. Furthermore, the described casting method has the positive side-effect that the surface of the casted work piece, for example the wind turbine rotor blade, becomes a better curing.

Additionally, the curing time of the resin can be controlled by adding amounts of a catalyst.

The invention claimed is:

1. A method for manufacturing a work piece comprising:
   preparing fibreglass in a mould;
   preparing a closed mould cavity around the fiberglass,
   flushing the closed mould cavity with a substantially oxygen-free gas, wherein the closed mould cavity is flushed with the substantially oxygen-free gas until the concentration of oxygen in a gas which is leaving the closed mould cavity during the flushing with the substantially oxygen-free gas is below a predefined value,
   after the flushing, injecting a resin in the closed mould cavity to form a casted work piece, and
   curing the casted work piece.

2. The method as claimed in claim 1, wherein a plurality of fibreglass layers are placed in the mould.

3. The method as claimed in claim 1, wherein the work piece is a wind turbine rotor blade.

4. The method as claimed in claim 1, the substantially oxygen-free gas is an inert gas.

5. The method as claimed in claim 4, wherein the inert gas is nitrogen.

6. The method as claimed in claim 1, wherein during said flushing, air in the closed mould cavity is completely replaced by the substantially oxygen-free gas.

7. The method as claimed in claim 1, wherein the closed mould cavity comprises an outlet for the gas which is leaving the closed mould cavity during the flushing with the oxygen-free gas and wherein the concentration of oxygen is monitored at the outlet.

8. The method as claimed in claim 1, wherein the concentration of oxygen is monitored by an oxygen content monitor.

9. The method as claimed in claim 1, wherein the resin injected in the closed mould cavity comprises styrene.

10. The method as claimed in claim 1, further comprising controlling a curing time of the resin by adding a catalyst.

\* \* \* \* \*